July 9, 1935.　　　　　F. FALLA　　　　　2,007,676
APPARATUS FOR BURNING CALCAREOUS MATERIALS
Filed Aug. 28, 1931　　　4 Sheets-Sheet 1
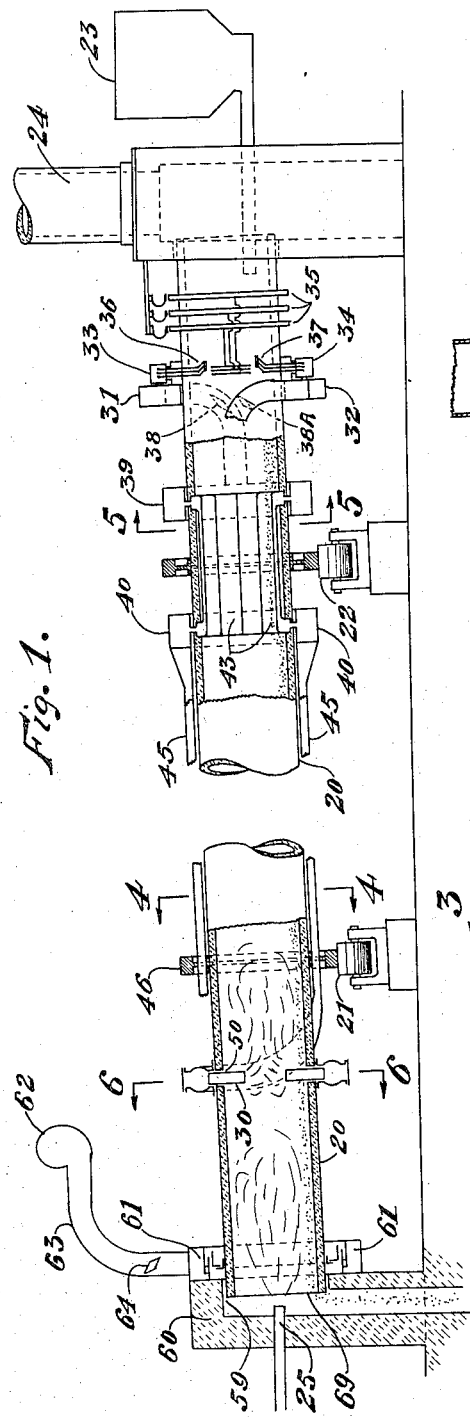
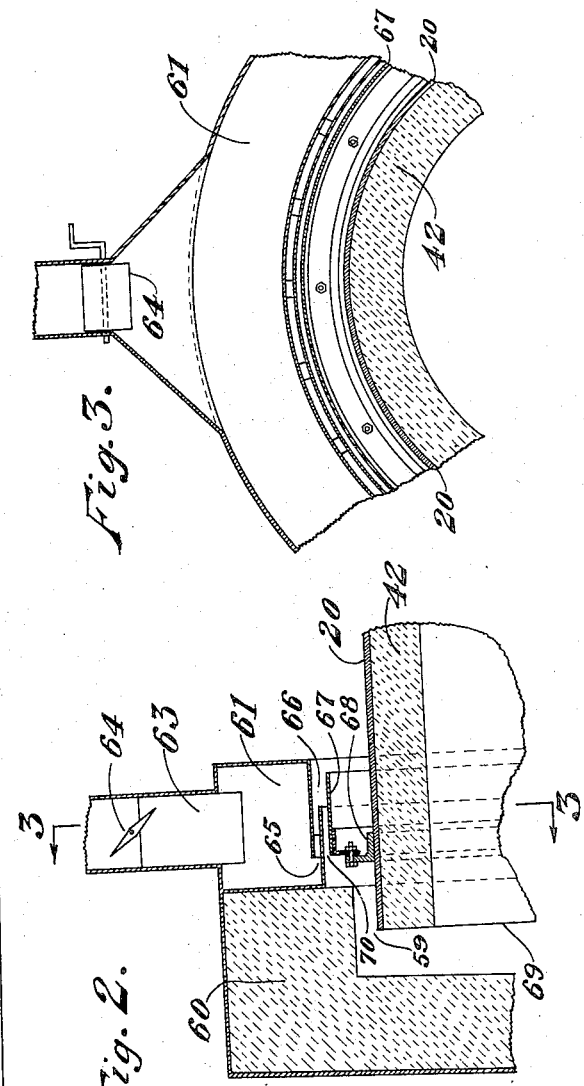
INVENTOR.
FERNANDO FALLA
BY
ATTORNEY.

July 9, 1935.  F. FALLA  2,007,676
APPARATUS FOR BURNING CALCAREOUS MATERIALS
Filed Aug. 28, 1931   4 Sheets-Sheet 2

INVENTOR.
FERNANDO FALLA
BY
ATTORNEY.

July 9, 1935.  F. FALLA  2,007,676
APPARATUS FOR BURNING CALCAREOUS MATERIALS
Filed Aug. 28, 1931   4 Sheets-Sheet 3

INVENTOR.
FERNANDO FALLA
BY
ATTORNEY.

Patented July 9, 1935

2,007,676

UNITED STATES PATENT OFFICE 2,007,676

APPARATUS FOR BURNING CALCAREOUS MATERIALS

Fernando Falla, Millburn Township, Essex County, N. J.

Application August 28, 1931, Serial No. 559,882

9 Claims. (Cl. 263—33)

The invention relates to apparatus for the burning of calcareous materials, for example, in the production of Portland cement and more especially as carried out in a rotary kiln.

It has for an object the more effective distribution of heat within the kiln, more particularly in connection with the operation of the kiln under conditions involving initially incomplete combustion of the fuel with subsequent complete combustion thereof at a point intermediate the ends of the kiln.

A further object of the invention resides in the provision of novel means for preheating air effecting the secondary or complete combustion within the kiln.

A still further object of the invention resides in the provision of means for conducting the preheated air through the kiln supporting tires.

Another object of the invention resides in the provision of a novel form of nozzle for introducing into the kiln the heated air for secondary combustion, as well as a novel arrangement of the nozzles therein.

The invention has for a still further object a novel sealing arrangement for the combustion end of the kiln.

In carrying out the invention, the temperature of combustion at the discharge or sintering zone of the kiln is carried to an extent sufficient only to clinker the cement and not, as is the general practice, boosted to as high a degree as possible. The combustion of the fuel introduced at this sintering zone is then completed at a point intermediate the ends of the kiln by the introduction of air which has been heated by the waste gases at the cooler or feed end of the kiln.

Provision is made for the mounting upon the rotating kiln at this end of one or more electrically-driven blowers which force air through a heat-interchanging or preheater device introduced into the kiln near its material inlet end. The inlet of this preheater is preferably located on the one side of one of the tires carrying the kiln and the outlet for the heated air on the other side of said tire, and the heater itself is designed as a part of the kiln. The air thus heated is carried by suitable ducts positioned over the periphery of the kiln, and thus exposed to radiation of heat from the kiln shell, to a header for a plurality of nozzle elements which serve to discharge the heated air into the intermediate zone where combustion is to be completed. These nozzles, furthermore, are of novel design being air-cooled and so constructed as to minimize caking thereon of the material being treated. At the fuel inlet end of the kiln, provision is also made for effecting a substantial and variable seal in order positively to control any air leakage at this point.

The nature of the invention, however, will best be understood when described in connection with the accompanying drawings, in which:

Fig. 1 is a part longitudinal section and side elevation of a kiln embodying the novel means for carrying out calcination.

Fig. 2 is a fragmentary longitudinal section, on an enlarged scale, of the discharge end of the kiln and illustrates a pneumatic seal therefor.

Fig. 3 is a fragmentary transverse section taken on the line 3—3, Fig. 2 of the drawings, and looking in the direction of the arrows.

Figure 4:
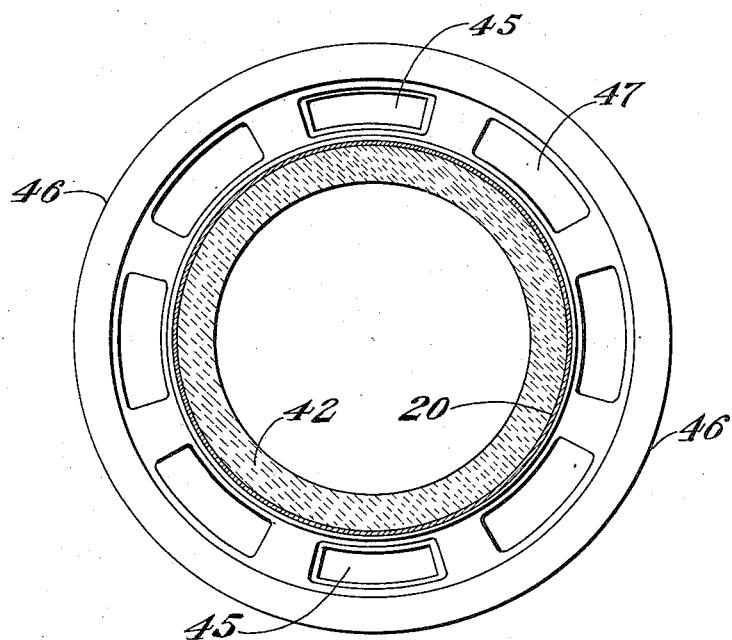
Figure 5:
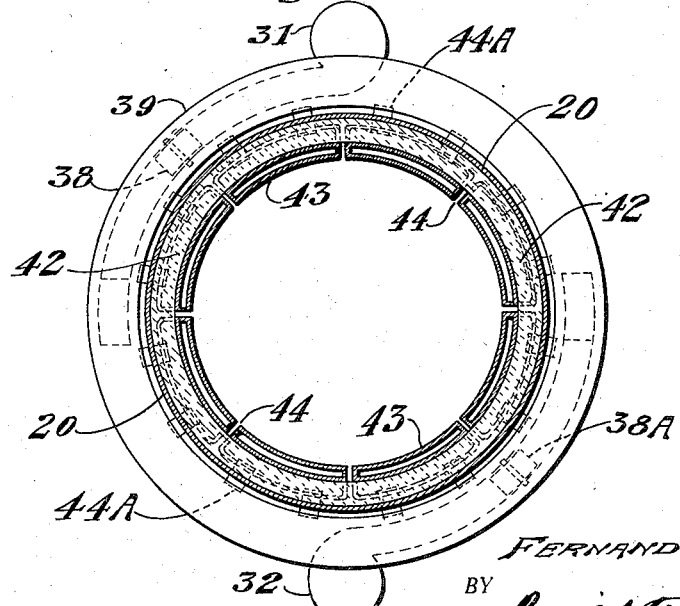

Figs. 4 and 5 are enlarged transverse sections through the kiln and taken, respectively, on the lines 4—4 and 5—5, Fig. 1 of the drawings, looking in the direction of the arrows.

Figure 6:
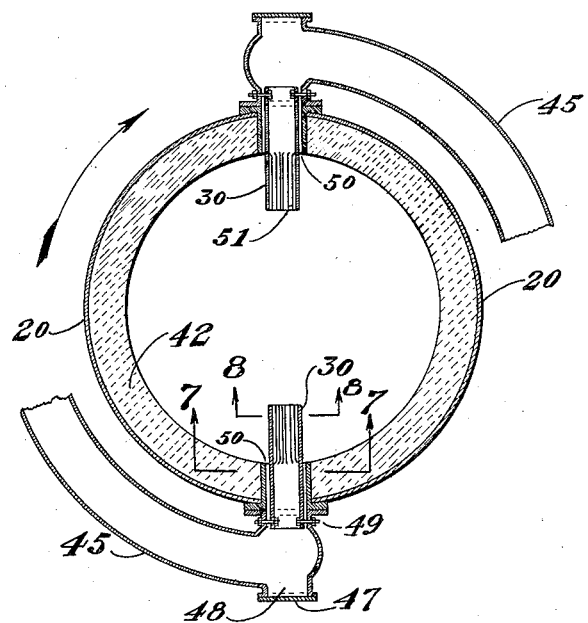

Fig. 6 is a transverse section, on an enlarged scale, through the nozzle elements and kiln for supplying air for secondary combustion, taken on the line 6—6, Fig. 1 of the drawings, and looking in the direction of the arrows.

Figure 7:
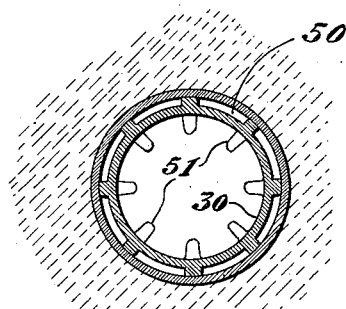
Figure 8:
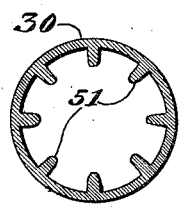

Figs. 7 and 8 are horizontal sections taken, respectively, on the lines 7—7 and 8—8, Figs. 6 of the drawings.

Figure 9:
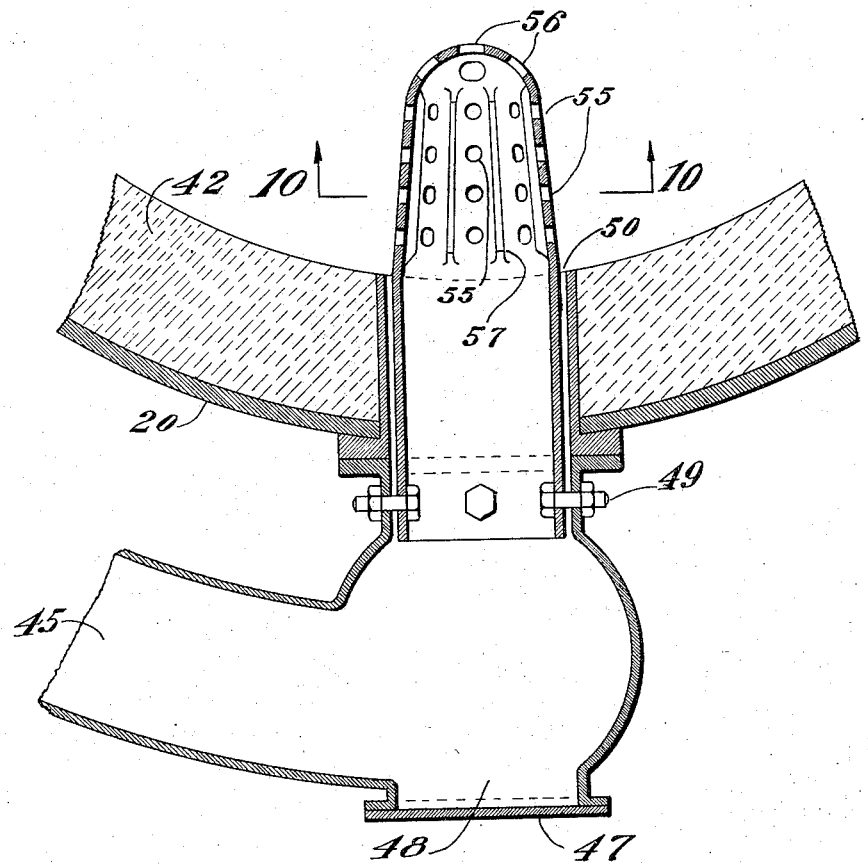

Fig. 9 is an enlarged transverse section through a nozzle member and kiln wall, illustrating a modification.

Figure 10:
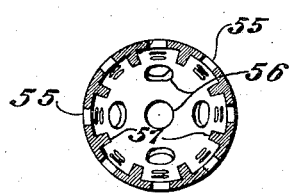

Fig. 10 is a horizontal section taken on the line 10—10, Fig. 9 of the drawings.

Referring to the drawings, a kiln is indicated as comprising the metallic cylinder 20 lined with suitable refractory material and mounted in the usual manner for rotation upon rollers 21, 22, etc., with longitudinal axis inclined slightly to the horizontal. The calcareous or other raw materials to be treated therein are arranged to be fed at the upper or higher end, as from a hopper 23, and are adapted to work themselves as a result of the rotation of the cylinder toward the lower end of the latter where the calcined sintered materials are eventually discharged. Combustion is arranged to take place at this lower end, the hot gases flowing through the cylinder in a direction counter to the flow of materials therein, and in accordance with the standard practice. A chimney 24 or other suitable suction device connects with the high end of the kiln to induce a flow of the gases through the cylinder and to withdraw the same therefrom for final discharge into the atmosphere.

In order to attain the desired temperature at the discharge end or sintering zone of cylinder 20, a burner 25 may extend axially therein to deliver fuel such as powdered coal and the like, the same being blown in by air jets or otherwise mixed with air to provide for combustion of the fuel.

However, in accordance with the invention, the supply of air at this point is insufficient to effect a complete combustion, the heated gases and unconsumed fuel being continued to a point intermediate the ends of the cylinder in proximity to the discharge end, that is to say, where it is desired that the calcining action on the material is to take place. At this point, additional air is arranged to be supplied to the interior of the cylinder for completing the combustion and for raising the temperature of the gases sufficiently to satisfactorily effect calcination of said material.

To this end, nozzle elements 30, hereinafter more fully described, are arranged to project preferably a substantial distance into the interior of the kiln, as indicated in Fig. 1 of the drawings, and are arranged to afford a supply of preheated air under pressure to the said interior.

This supply of air and the heating thereof is secured in the following manner. A blower, and preferably a pair of blowers 31 and 32, are mounted near the material inlet end of the kiln to rotate with the latter and are driven by suitable electric motors 33 and 34, respectively, to which power is furnished through the slip rings 35, suitable switches 36 and 37 being provided to cut in one or both of said motors. Dampers 38 and 38A may also be provided for regulating or shutting off the flow from the blowers, the air passing through connecting flues to a header or the like 39. This header, together with a discharge header 40, is secured to the kiln and is part of an interposed heat-interchanging section of said kiln, the same being more clearly shown in Fig. 5 of the drawings.

Referring to this figure, the outer metallic enclosing shell 20 of the kiln surrounds a cylinder 42 of refractory material along whose inner surface is secured a plurality of arcuate longitudinally disposed heater duct members or flues 43 connecting at their opposite ends with the respective headers 39 and 40. These heater duct members 43 are so disposed over the inner surface of the refractory lining 42 that there will be gaps 44 between them to provide for expansion and contraction as well as to allow for convenient renewals when necessary, and also to avoid the necessity for an entire replacement if only a short annular cylinder section fails. The said duct members, furthermore, just rest against the inner surface of the refractory lining 42, which lining provides also an insulation medium therefor. By this expedient, the duct members are exposed to the heat of the gases within the kiln, and the heat thus absorbed will not be dissipated through the outer metallic shell 20 of the kiln which radiates considerable heat.

The location of the preheater in the kiln is such that the temperaure to which the gases will heat the air is substantially equal to that of the materials at the particular location, and thereby any chilling effect on the materials is obviated.

The heater duct members 43 are supported by means of short metallic tubing members 44A and are securely fastened to the inner surface of the headers 39 and 40 and also into the ends of the duct members 43. These tubing members may be secured in the same manner as a boiler tube is expanded when put in place, as by upsetting its ends.

This heat-interchanging section formed by the ducts or flues 43 thus becomes an integral part of the kiln and the heated spent gases in passing therethrough serve to elevate to an appreciable extent the air passing counter-current through the duct members 43. From the header 40, in turn, provision is made to deliver the heated air collecting therein to the series of nozzle elements 30, in the present instance two. Reference being had to Figs. 1 and 4 of the drawings, it will be noted that there is secured about the metallic cylinder 20 of the kiln a plurality of longitudinally disposed tubes 45 terminating at one end in the header 40 and at the other terminating in the respective nozzles. In order to allow these tubes to pass the rim or rims 46 supporting the kiln, said rim is of the nature of an I-beam, the web of which is perforated as at 47 to pass a tube 45.

The nozzles 30 for delivering this heated air to the intermediate zone of the kiln do not terminate flush with the surface of the inner refractory lining as is the usual practice, but project to an appreciable extent therein, as indicated in Figs. 1 and 6. By this expedient, the air is discharged thereby without first contacting with the material being treated as it slides along the inner surface of the shell.

In order to obviate caking or accumulation of deposits and formation of large lumps of the treated material upon and about these projecting portions of the nozzles, provision is made for introducing an annulus or tubular jacket of air about the same, for example, as in arranging a cylindrical passageway 50 about the entrance portion of a nozzle, said passageway communicating with the inlet duct 45 of the nozzle. This also serves to cool the nozzles and it is preferred, furthermore, to flute the said nozzles, as by providing the longitudinal internal ribs 51 along the inner wall, in order to maintain these as cool as possible.

Another expedient for minimizing accumulation of deposits upon the tip of the nozzle is indicated in Figs. 9 and 10 of the drawings wherein the portion of the nozzle extending within the kiln is indicated as provided with a series of circumferentially disposed perforations 55, together with perforations 56 at the extreme outer end of the nozzle. The latter perforations are of larger diameter and area than the former to allow for the blowing out therethrough of any particles which might have entered through the side perforations 55. Internal ribs 57 may also be provided in this type of nozzle between the rows of perforations.

Provision is made to enable ready renewal of a nozzle 30 whenever necessary and without having to first cool the kiln. For this purpose, the end of a duct 45 is so constructed that a nozzle 30 is kept in position by means of bolts 49, and at the end of duct 45 near the nozzles 30 a removable cover 47 normally closes an opening 48. The latter is so constructed, furthermore, that a nozzle 30 may be removed through this opening by temporarily removing the cover 47 and introducing suitable tools through the opening. By this expedient, a damaged nozzle 30 may be removed and replaced without having to cool the kiln down.

In the operation of the kiln, furthermore, the suction prevailing therein will tend to draw into the kiln an objectionable volume of air through the necessary clearance opening 59 between its lower end and the sealing wall 60 about the same. This leakage is, of course, in uncontrolled amounts and with the provision of means for secondary combustion would ordinarily introduce a serious disturbing factor.

To obviate this and positively to control the degree of leakage or entirely nullify the same, there is provided a pneumatic seal about the kiln close to its said discharge end as in a circular air duct 61 adapted to receive air under pressure from a fan 62 and conduit 63, in which latter is mounted a damper 64 for controlling the pressure of delivered air. Duct 61 along its inner surface is provided with an annular outlet passageway 65, said passageway communicating with a further passageway 66 bounded along the lower portion by a circular metal ring 67 adjustably secured to the upstanding wall of an angle piece 68 secured to the outer surface of shell 20 of the kiln. Passageway 66 also is in communication with the discharge end of the kiln through discharge chamber 69 formed between said end and the wall 60, and the flow from the chamber 60 out through a further annular passageway 70 may thus be controlled.

Thus, by introducing a positive pressure into passageway 66 an ejector action will occur to reduce the pressure in passageway 70 tending to neutralize the negative pressure in the chamber 69; and by controlling the degree of pressure of the air discharged through passageway 65 the tendency of air to flow into chamber 69 may be entirely overcome or, when desired, a certain amount of leakage may be permitted through suitable control of the damper 64.

I claim:

1. In a rotary kiln for the burning of calcereous material: a primary combustion zone substantially at the discharge end, a secondary combustion zone beyond said primary zone, means intermediate the secondary combustion zone and the charging end of the kiln and exposed to the gases passing therethrough for preheating air, and metallic ducts connected to said intermediate means for conveying the preheated air to the secondary combustion zone, said ducts passing externally over the periphery of the kiln and exposed to radiation therefrom.

2. In a rotary kiln for the burning of calcereous material: a primary combustion zone substantially at the discharge end, a secondary combustion zone beyond said primary combustion zone, a preheater for air inserted in the kiln in proximity to its charging end and at a point at which the desired air temperature attained is substantially equal to the temperature of the material passing said point, and means connected with said preheater for introducing the preheated air to the secondary combustion zone.

3. In a rotary kiln for the burning of calcareous material and including attached tires for rotatably supporting the kiln: a primary combustion zone substantially at the discharge end, a secondary combustion zone beyond said primary combustion zone, means associated with the kiln for preheating air and having within the kiln shell an inlet for air at one side of a supporting tire and an outlet at the other side thereof, and means connected with the outlet of the preheating means and passing through a further supporting tire for introducing the preheated air to the secondary combustion zone.

4. In a rotary kiln for the burning of calcareous material: a primary combustion zone substantially at the discharge end, a secondary combustion zone beyond said primary combustion zone, a sectional air preheating cylinder interposed between the ends of the kiln and rotatable therewith, and means connected with the said preheating cylinder for introducing the preheated air to the secondary combustion zone.

5. In a rotary kiln for the burning of calcareous material: a primary combustion zone substantially at the discharge end, a secondary combustion zone beyond said primary combustion zone, means associated with the kiln for preheating air, and nozzles connected with said preheating means and extending beyond the inner wall of the kiln at a point substantially at the beginning of the secondary combustion zone, said nozzles being spaced from the entrance opening into the kiln to afford a cylindrical passageway about a nozzle for the passage of the preheated air.

6. In a rotary kiln for the burning of calcareous material: a primary combustion zone substantially at the discharge end, a secondary combustion zone beyond said primary combustion zone, means associated with the kiln for preheating air, and nozzles connected with said preheating means and extending beyond the inner wall of the kiln at a point substantially at the beginning of the secondary combustion zone, said nozzles being spaced from the entrance opening into the kiln to afford a cylindrical passageway about a nozzle for the passage of the preheated air and the sides and tip of the nozzle being perforated.

7. In a rotary kiln for the burning of calcareous material: a primary combustion zone substantially at the discharge end, a secondary combustion zone beyond said primary combustion zone, means associated with the kiln for preheating air, and nozzles connected with said preheating means and extending beyond the inner wall of the kiln at a point substantially at the beginning of the secondary combustion zone, said nozzles being spaced from the entrance opening into the kiln to afford a cylindrical passageway about a nozzle for the passage of the preheated air and having internal longitudinal ribs.

8. In a rotary kiln for the burning of calcareous material: a primary combustion zone substantially at the discharge end, a secondary combustion zone beyond said primary combustion zone, means associated with the kiln for preheating air, and nozzles connected with said preheating means and extending beyond the inner wall of the kiln at a point substantially at the beginning of the secondary combustion zone, said nozzles being spaced from the entrance opening into the kiln to afford a cylindrical passageway about a nozzle for the passage of the preheated air and a nozzle having internal longitudinal ribs and being perforated at the sides and tip.

9. In a rotary kiln for the burning of calcareous material: a primary combustion zone substantially at the discharge end, a secondary combustion zone beyond said primary combustion zone, means associated with the kiln for preheating air, and nozzles connected with said preheating means and extending beyond the inner wall of the kiln at a point substantially at the beginning of the secondary combustion zone, said nozzles being spaced from the entrance opening into the kiln to afford a cylindrical passageway about a nozzle for the passage of the preheated air and the sides and tip of the nozzle being perforated with the latter perforation the larger.

FERNANDO FALLA.